US008442483B2

(12) United States Patent
Gunasekara (10) Patent No.: US 8,442,483 B2
(45) Date of Patent: *May 14, 2013

(54) METHOD FOR COMMUNICATING INDOOR LOCATION TO AN EMERGENCY SERVICE SYSTEM

(75) Inventor: Don Gunasekara, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,035

(22) Filed: Feb. 6, 2012

(65) Prior Publication Data

US 2012/0135704 A1 May 31, 2012

Related U.S. Application Data

(60) Continuation of application No. 13/084,081, filed on Apr. 11, 2011, now Pat. No. 8,145,185, which is a division of application No. 11/937,292, filed on Nov. 8, 2007, now Pat. No. 7,991,382.

(51) Int. Cl.
*H04M 11/04* (2006.01)

(52) U.S. Cl.
USPC .................. 455/404.2; 455/404.1; 455/456.1; 455/456.5

(58) Field of Classification Search ............... 455/404.1, 455/404.2, 456.1–457
See application file for complete search history.

(56) References Cited

U.S. PATENT DOCUMENTS

| 5,736,962 | A | 4/1998 | Tendler |
| 6,083,248 | A * | 7/2000 | Thompson .................. 607/30 |
| 6,985,753 | B2 | 1/2006 | Rodriguez et al. |
| 7,245,900 | B1 | 7/2007 | Lamb et al. |
| 7,937,067 | B2 * | 5/2011 | Maier et al. ................ 455/404.1 |
| 2005/0105496 | A1 | 5/2005 | Ambrosino |
| 2005/0213716 | A1 | 9/2005 | Zhu et al. |
| 2007/0147348 | A1 | 6/2007 | Lu |
| 2008/0077326 | A1 | 3/2008 | Funk et al. |
| 2009/0270066 | A1 | 10/2009 | Noguchi et al. |

OTHER PUBLICATIONS

IETF document titled "Location Conveyance for the Session Initiation Protocol draft-ietf-sip-location-conveyance-08.txt" Jul. 9, 2007.*
IETF RFC 3261 SIP: Session Initiation Protocol, Jun. 2002.*
Mark Amundson, Honeywell International, Inc., "Dead Reckoning for Consumer Electronics," 2006.

(Continued)

*Primary Examiner* — Patrick Edouard
*Assistant Examiner* — Ronald Eisner (57) ABSTRACT

A method for communicating location to an emergency service system. A wireless communication device (WCD) such as a cell phone attains a GPS location fix when outdoors and then uses dead reckoning to determine its direction(s) and distance(s) of travel reaching a position inside a building. When a user of the WCD places an emergency call, the WCD conveys an indication of its indoor location in a signaling message to an emergency service center, and an intermediation system such as an IMS system translates the indoor location indication to a textual description of a portion of the building (e.g., room, cubicle, zone, etc.) that encompasses the indicated location. An emergency service operator can thus receive the building portion description, to facilitate emergency service response. Further, a similar process can then be repeated during the call, to provide an updated building portion description to the operator.

16 Claims, 2 Drawing Sheets

OTHER PUBLICATIONS

Mark Amundson, Honeywell International, Inc., "Compass Assisted GPS for LBS Application," 2006.

Ublox, "Antaris® Supersense™ Field Tests—Application Note," 2004.

Wikipedia, "Dead Reckoning," http://en.wikipedia.org/wiki/Dead_reckoning, printed from the World Wide Web on May 1, 2007.

* cited by examiner

METHOD FOR COMMUNICATING INDOOR LOCATION TO AN EMERGENCY SERVICE SYSTEM

REFERENCE TO RELATED APPLICATIONS

This is a continuation of U.S. patent application Ser. No. 13/084,081, filed Apr. 11, 2011, which is a divisional of U.S. patent application Ser. No. 11/937,292, filed Nov. 8, 2007, which issued as U.S. Pat. No. 7,991,382. The entirety of each of these earlier applications is hereby incorporated by reference.

BACKGROUND

For certain types of calls, it can be advantageous to obtain information regarding the location of the caller. For example, when a Public Safety Answering Point (PSAP) answers an emergency-services call, it is desirable for the PSAP to be able to automatically determine the location of the caller in order to quickly dispatch assistance to that location. For calls made from landline phones, which typically have fixed locations, the PSAP usually determines the caller's location based on the calling-party number included in the SS7 or other signaling that is used to route the call to the PSAP. In particular, the PSAP may consult a database, such as an Automatic Location Identification (ALI) database, to determine what physical location is associated with the landline calling-party number.

For calls made using a wireless phone and a wireless wide area network (WWAN), however, difficulty can arise because the wireless phone is mobile and is thus not associated with a fixed location. Furthermore, for calls made using a voice-over-IP capable phone (whether wired or wireless), additional difficulty can arise because such a phone may be connected to virtually any network port (at any location) when the phone initiates the call.

OVERVIEW

This document describes an innovative method for conveying the location of a wireless communication device (WCD) to an emergency service system, so as to provide the location to a PSAP and to thereby facilitate emergency service response.

The method relates to a situation where the WCD has determined its location using GPS technology but then enters a building where GPS coverage no longer exists (or is insufficient) and, from within the building, the WCD places an emergency service call such as a 9-1-1 call. At issue in that situation is how to determine and communicate to the PSAP an indication of where in the building the WCD is currently located, so that a PSAP operator can readily dispatch assistance to that in-building location.

In accordance with the method, when the WCD enters the building and detects that it has lost its GPS signal (i.e., that it no longer has a clear enough view of the GPS satellites in the sky), the WCD will begin dead reckoning using a compass and pedometer built into the WCD, so that coordinates of the WCD's indoor location can be determined. In particular, the WCD will use its compass and pedometer to determine directions and distances of travel of the WCD within the building. Given the WCD's last known GPS location coordinates, those directions and distances of travel will then be used to geometrically compute new indoor location coordinates of the WCD, as a change in position from the last known GPS location.

While within the building, when the WCD places a 9-1-1 call, the WCD will then generate and transmit a SIP INVITE or other such signaling message that carries data indicative of the WCD's indoor location coordinates. Here, two options are contemplated. As one option, the WCD itself can use its determined directions and distances of travel to geometrically extrapolate from its last known GPS location, so as to determine its current indoor location coordinates, and the WCD can include the determined indoor location coordinates in the SIP INVITE. As another option, the WCD can more simply include within the SIP INVITE its determined directions and distances, using Geographic Markup Language (GML) for instance, leaving to another entity the task of translating the directions and distances into the WCD's current indoor location.

The SIP INVITE transmitted by the WCD generally functions to invoke initiation of a Real-time Transport Protocol (RTP) session between the WCD and the PSAP. For instance, an emergency service network containing the PSAP may receive the SIP INVITE, respond with a SIP 200 OK, and then receive a SIP ACK, completing establishment of an RTP session, and thereby allowing a PSAP operator to communicate with a user of the WCD. SIP signaling like this may flow through an IP Multimedia Subsystem (IMS) (gaining Via headers or the like along the way) that functions to apply various services to the signaling along its way. For instance, the IMS system may include a Call Session Control Function (CSCF), which is largely an enhanced SIP proxy server that can invoke various servers or services to act upon SIP signaling.

Pursuant to the method, the SIP INVITE will pass through an intermediary on its way from the WCD to the emergency service system, and the intermediary will conveniently convert the WCD's indoor location coordinates into a description of where in the building the WCD is located, such as a description of the room, office-cubicle, or the like where the WCD is located in the building. (The intermediary may also leave an indication of the raw indoor location coordinates in the SIP INVITE). If the SIP INVITE includes a GML indication of the WCD's directions and distances of travel, the intermediary may first carry out the function of geometrically extrapolating from the WCD's last known GPS location (which would also be specified or earlier indicated) so as to determine the WCD's current indoor location coordinates. Provided with the WCD's indoor location coordinates, the intermediary may establish a description of where in the building those coordinates reside, such as by simply referring to mapping data that correlates location coordinates (e.g., ranges of location coordinates) with areas within the building.

The intermediary will then pass along the SIP INVITE, now containing the description of where in the building the WCD is currently positioned, for continued transmission to the emergency service system. Thus, in addition to invoking establishment of an RTP session for the 9-1-1 call, the SIP INVITE will advantageously convey to the emergency service system a description of where in the building the WCD is currently positioned. And the PSAP may then conveniently present that description to a PSAP operator, to facilitate emergency response.

In a further respect, the method may then involve providing the emergency service system with an updated indoor location of the WCD as the WCD moves during the course of the 9-1-1 call, so as to keep the PSAP apprised of where the WCD is located in the building. In particular, during the call, the WCD may continue to apply its compass and pedometer to determine one or more further distances of travel and one or more further directions of travel. Perhaps in response to moving a threshold distance, the WCD may then generate and send to the emergency service system a SIP UPDATE message that includes an indication of the WCD's new indoor location coordinates. Again, the WCD may include the raw (e.g., GML) indications of distances and directions of travel, or the WCD may itself use the distances and directions of travel to geometrically compute its new indoor location and may include the new indoor location coordinates in the UPDATE message. As the SIP UPDATE passes through the intermediary, the intermediary will then map the updated indoor location to an updated description of where in the building the WCD is located. Thus, the emergency service system would receive the updated description, and the PSAP may present the updated description to the PSAP operator, to further facilitate emergency response.

These as well as other aspects will become apparent by reading the following detailed description with reference where appropriate to the accompanying drawings.

DETAILED DESCRIPTION

An exemplary embodiment of the present method functions to communicate the indoor location of a WCD (e.g., a cellular telephone) to an emergency service system that comprises a PSAP, where the WCD includes a GPS receiver, a compass, a pedometer, and a wireless transceiver. In practice, the WCD uses its GPS receiver to receive GPS satellite signals, and the WCD then uses the received satellite signals to determine its GPS location coordinates. In turn, the WCD then uses its compass and pedometer as a basis to update the determined GPS location coordinates based on the distance(s) and direction(s) traveled by the WCD within a building, thereby establishing indoor location coordinates of the WCD. And the WCD uses its wireless transceiver to transmit its established indoor location coordinates in a SIP INVITE message seeking to set up a call to the emergency service system, where the SIP INVITE message invokes establishment of an RTP session between the PSAP and the WCD.

As presently contemplated, an intermediary in a SIP communication path between the WCD and the emergency service system will (i) receive the SIP INVITE message, (ii) translate the indoor location coordinates to a "building portion descriptor" that describes a portion of the building (e.g., a room, office-cubicle, or other area) where the indoor location coordinates reside, and (iii) send the SIP INVITE message, including the building portion descriptor, along to the emergency service system. The building portion descriptor may then facilitate emergency response, by letting a PSAP operator know where the emergency caller is currently located within the building and thereby enabling dispatch of emergency assistance to that in-building location.

In the exemplary method, the WCD may be programmed to periodically attain a GPS location fix. In that case, the act of applying the GPS receiver to receive the GPS satellite signals and using the received signals to determine GPS location coordinates of the WCD can be an instance of the WCD periodically attaining a GPS location fix. Namely, it could be the last such instance before the WCD enters the building and loses its GPS signal.

Further, the act of the WCD using its compass and pedometer as a basis to update its GPS location coordinates in accordance with distance and direction of the WCD inside the building may take various forms. For example, it may involve using the compass to determine (as accurately as the WCD is capable) at least one direction of travel of the WCD, concurrently using the pedometer to determine (also as accurately as the WCD is capable) at least one distance of travel of the WCD, and using the at least one direction of travel and the at least one distance of travel cooperatively to update the GPS location coordinates. In particular, applying simple geometric calculations, the WCD may programmatically plot out its movement from its last GPS fix, so as to determine its current location. (Further, the WCD may do this regularly between GPS fixes, to plan for the possibility that the WCD may be unable to attain a next GPS fix). Preferably, the GPS location coordinates will comprise latitude and longitude coordinates, and the indoor location coordinates will likewise comprise latitude and longitude coordinates (as best calculated by the WCD), so this computation should be straightforward.

The exemplary method may further involve the WCD itself generating the SIP INVITE message containing a specification of the WCD's established indoor location coordinates. In that case, the act of using the wireless transceiver to transmit the established indoor location coordinates in a SIP INVITE message seeking to set up a call to the emergency service system may involve transmitting the SIP INVITE message, including the specification, via an air interface from the WCD to a radio access network (RAN) serving the WCD. The SIP INVITE message may then pass from the RAN via a packet-switched network to an IMS CSCF and thereafter to the intermediary, unless the CSCF itself functions as the intermediary. In turn, the intermediary may translate the specification into a corresponding building-portion descriptor, add the building-portion descriptor to the SIP INVITE message, and transmit the SIP INVITE message containing the building portion descriptor via the packet-switched network to the emergency service system. The PSAP may then receive the building-portion descriptor (or a derivative of the building-portion descriptor) and present to a human PSAP operator the indicated in-building location of the WCD, so as to facilitate emergency response.

As noted above, the exemplary method may further involve carrying out a process to update the in-building location of the WCD during the course of the emergency service call (i.e., anytime after initiation of the call, or, for that matter, even after the call is finished). In particular, the WCD may use its compass and pedometer as a basis to update its indoor location coordinates in accordance with its distance(s) and direction(s) of movement within the building, thereby establishing updated indoor location coordinates of the WCD. The WCD may then use its wireless transceiver to transmit the updated indoor location coordinates in a SIP UPDATE message. As with the initial SIP INVITE message, the intermediary may then (i) receive the SIP UPDATE message, (ii) translate the updated indoor location coordinates to an updated building-portion descriptor (which might still be the same as the original building portion descriptor, if the WCD remains in the same in-building portion, e.g., the same room or cubicle), and (iii) send the SIP UPDATE message, including the updated building portion descriptor, along to the emergency service system. The PSAP may then receive the updated building portion descriptor and present the updated building portion descriptor to the human PSAP operator, so that the updated building portion descriptor can further facilitate emergency response.

To facilitate translating the indoor location coordinates to the building portion descriptor (and, likewise, the updated location coordinates to the updated building portion descriptor), the method may involve maintaining mapping data that correlates location coordinates with building portion descriptors, i.e., specifying ranges of indoor location coordinates that fall with particular building portions (e.g., rooms, cubicles, etc.) In practice, the intermediary or another entity could maintain such data for each of a plurality of buildings and could select the appropriate set of data based on the position of the WCD's last GPS fix. Provided with such mapping data, the act of translating the indoor location coordinates to the building portion descriptor may involve referring to (e.g., querying) the mapping data so as to translate the indoor location coordinates to a corresponding building portion descriptor.

In another respect, after the WCD has attained a latest GPS fix, the WCD may thereafter enter (e.g., be carried otherwise moved into) a building, and the WCD may detect that it is unable to receive GPS satellite signals. In particular, the WCD may try to apply its GPS receiver to receive signals from GPS satellites in its vicinity but the WCD may fail, as the WCD may then lack a clear enough view of the sky. Responsive to detecting that it is unable to receive GPS satellite signals, the WCD may then use its compass and pedometer to establish at least one direction of travel of the WCD and at least one distance of travel of the WCD. (Note that if the WCD is arranged to regularly use its compass and pedometer to establish directions and distances between GPS fixes, then the function of responsively using the compass and pedometer for this purpose may involve responsively retaining such information, whereas the WCD would otherwise normally dispose of the information upon receiving a next GPS fix.)

While the WCD is in the building, the WCD may then receive a user request to initiate an emergency service call, such as by a user dialing 9-1-1 or engaging a 9-1-1 speed dial function. In response, the WCD may then responsively generate and use its wireless transceiver to transmit via an air interface and a RAN serving the WCD, into a packet-switched network, a SIP INVITE message that invokes establishment of an RTP session between the WCD and the PSAP and that carries (a) the WCD's last determined GPS location coordinates and (b) indications of the at least one determined direction of travel of the WCD and the at least one determined distance of travel of the WCD. As noted above, for instance, the WCD may use GML to set forth the distance(s) and direction(s) in the SIP INVITE message.

In accordance with the exemplary method, a network server will then (i) receive the transmitted SIP INVITE message, (ii) read the GPS location coordinates and indications of at least one determined direction of travel and at least one determined distance of travel from the SIP INVITE message, (iii) use the at least one determined direction of travel and at least one determined distance of travel to update the GPS location coordinates so as to establish indoor location coordinates, (iv) reference mapping data to translate the indoor location coordinates into a building portion descriptor that describes a portion of a building (e.g., room, cubicle, etc.) where the indoor location coordinates reside in the building, and (v) transmit the SIP INVITE message, including the building portion descriptor, along to the emergency service system. The building portion descriptor may then be presented to a human PSAP operator, to facilitate emergency response.

As noted above, the SIP INVITE message generated and transmitted by the WCD may pass to an IMS CSCF on its way to the emergency service system. In that case, the CSCF may itself function as the network server that uses the WCD's indicated distances and directions of travel from the WCD's last GPS location as a basis to establish and provide the building-portion descriptor. Alternatively, the CSCF could call out to the network server to facilitate part or all of this determination.

For instance, the CSCF could query the network server, to have the network server determine the in-building location coordinates and translate those coordinates to a building-portion descriptor, and the CSCF could then insert the building-portion descriptor into the SIP INVITE before sending the SIP INVITE to the emergency service system. Alternatively, the CSCF could simply send the SIP INVITE message to the network server, the network server could establish the building-portion descriptor, add the building-portion descriptor to the SIP INVITE message, and send the modified SIP INVITE message back to the CSCF. The CSCF could then send the SIP INVITE message along its way to the emergency service system. Still alternatively, the network server could directly transmit the modified SIP INVITE message to the emergency service system rather than sending it back to the CSCF for transmission.

Also as noted above, the method may involve conveying to the emergency service system one or more updates of the WCD's in-building location during the course of the RTP session. In particular, the WCD may use its compass and pedometer to establish at least one further direction of travel of the WCD and at least one further distance of travel of the WCD, and the WCD may use its wireless transceiver to transmit via the air interface and RAN, into the packet-switched network, a SIP UPDATE message carrying the at least one further direction of travel and at least one further distance of travel (e.g., using GML). The network server may then (i) receive the transmitted SIP UPDATE message, (ii) read the at least one further direction of travel and at least one further distance of travel from the SIP UPDATE message, (iii) use the at least one further direction of travel and at least one further distance of travel to update the indoor location coordinates so as to establish updated indoor location coordinates, (iv) reference the mapping data to translate the updated indoor location coordinates into an updated building portion descriptor, and (v) transmit the SIP UPDATE message, including the updated building portion descriptor, along to the emergency service system. The updated building portion descriptor may then be presented to the human PSAP operator, to further facilitate emergency response.

In this embodiment, like that described above, the mapping data that correlates location coordinates with building portion descriptors can be maintained at the network server. Alternatively, the mapping data could be maintained elsewhere and made accessible to the network server.

In another respect, the exemplary method may function to convey location of a WCD to an emergency service system including a PSAP. In practice, the WCD may apply its GPS receiver to receive GPS satellite signals, and the WCD may use the received signals to periodically attain GPS location fixes (location coordinates of the WCD). In this method, after the WCD attains a latest GPS location fix, the WCD then enters a building where the WCD lacks a clear enough view of the sky to attain a next GPS location fix. Once in the building, the WCD then applies its compass and pedometer to determine at least one direction of travel of the WCD within the building and at least one distance of travel of the WCD within the building, and the WCD uses the determined direction(s) and distance(s) cooperatively to update the location coordinates of the latest GPS location fix so as to establish indoor location coordinates of the WCD.

While the WCD is in the building, the WCD then receives from a user of the WCD an emergency service call request, and the WCD responsively transmits, via an air interface to a RAN for transmission in turn to the emergency service system, a Session Initiation Protocol (SIP) INVITE message seeking to set up the emergency service call, including within the SIP INVITE message the established indoor location coordinates. In accordance with the method, an intermediary in a communication path between the WCD and the emergency service system then (i) receives the SIP INVITE message, (ii) translates the indoor location coordinates to a descriptor of a portion of the building, and (iii) sends the SIP INVITE message, including the descriptor of the portion of the building, along to the emergency service system. The descriptor of the portion of the building can then be presented to a human PSAP operator, so as to facilitate emergency response.

Figure 1:
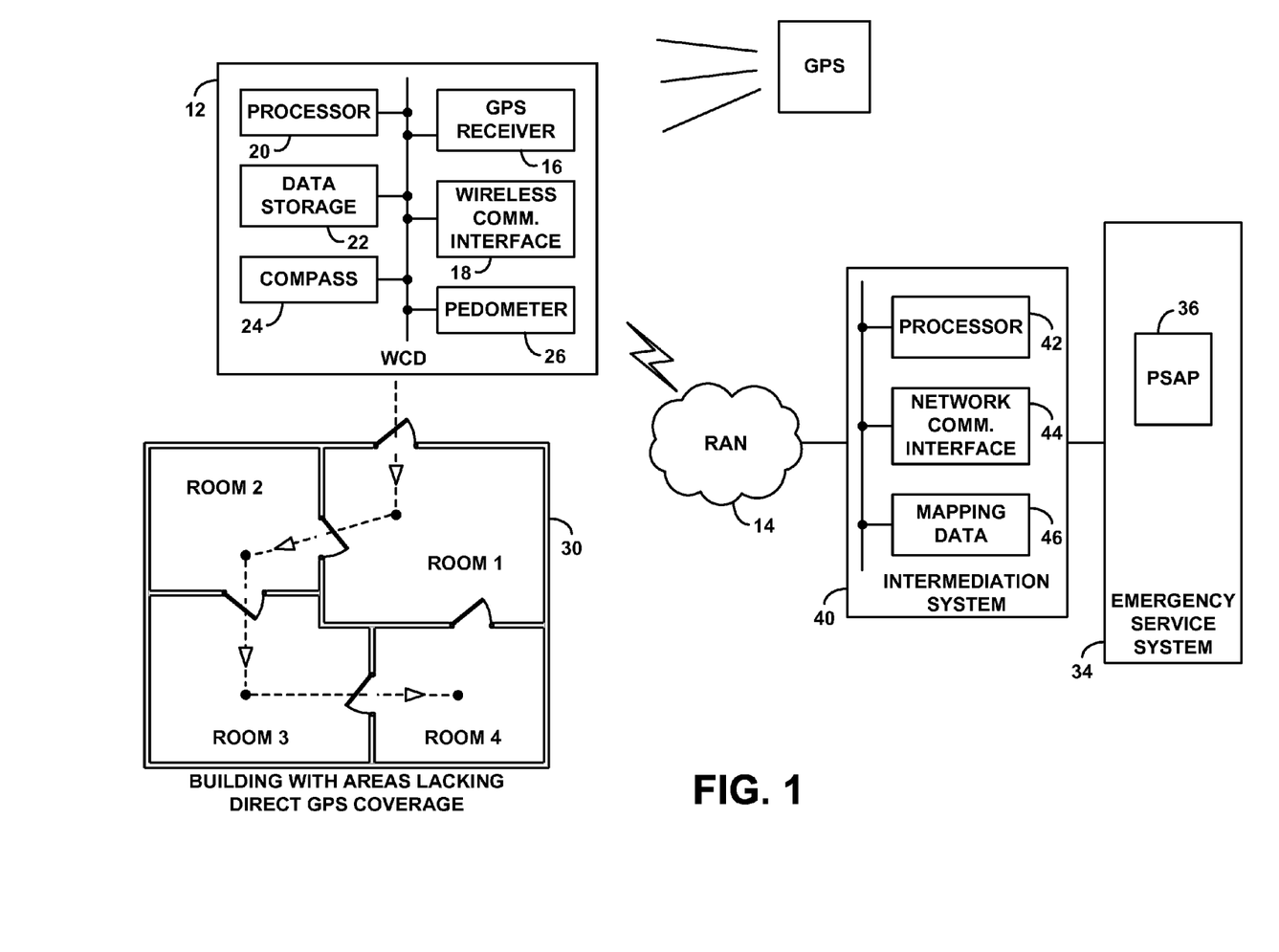
FIG. 1 is a block diagram of an arrangement in which the method can be implemented.

Referring to now the figures, FIG. 1 is a simplified block diagram depicting an arrangement in which the present method can be implemented. It should be understood, of course, that variations from this and other arrangement shown and described herein are possible. For instance, elements can be added, removed, combined, distributed, re-ordered, or otherwise modified. Further, it should be understood that functions described herein as being carried out by a device, server, and/or other entity can be carried out by one or more a suitably programmed processors or by any combination of hardware, software, and/or firmware.

As shown in FIG. 1, the exemplary arrangement includes a WCD 12, such as portable handheld cell phone, a personal digital assistant, or another device that is capable of initiating an emergency service call, such as a 9-1-1 call. The WCD 12 is served by a cellular radio access network (RAN) 14 operating according to any air interface protocol now known or later developed, examples of which currently include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth.

As shown, the WCD 12 includes a GPS receiver 16 (for receiving GPS satellite signals), a cellular wireless transceiver 18 (for communicating with the RAN), a processor (one or more processors) 20, and data storage 22 containing program instructions executable by the processor to carry out various functions described herein. Further, the WCD 12 includes a compass 24 and a pedometer 26, which can be used in combination to facilitate dead reckoning so as to keep track of the WCD's location between GPS location fixes or when the WCD loses GPS coverage. In practice, the compass 24 can be an electronic compass or other sensor of a type well known in the art that indicates direction of travel with reference to magnetic north, and the pedometer 26 can be any sort of meter (e.g., an electro-mechanical pendulum or ball-bearing based pedometer) that indicates a distance of travel. As the pedometer may measure distance of travel in terms of number of steps taken by the person carrying the WCD, the pedometer 26 or WCD 12 is preferably calibrated in advance to account for the average stride of the user, so that the WCD can convert a count of steps into a fairly accurate approximation of distance traveled.

As further shown, the exemplary arrangement includes a building 30 (such as a home, office, or theater for instance) into which the WCD 12 can be carried, with a possible path of travel of the WCD within the building shown by dashed lines and dots. The example building 30 is represented illustratively by a floor plan that shows various indoor building portions or areas (such as rooms or cubicles, for instance) into which the WCD may be carried. In the exemplary embodiment, the WCD 12 can initiate an emergency service call from anywhere within the building. Aside from merely reporting to the PSAP the location of the building in which the WCD is located, it is also important to inform the PSAP where in the building the WCD is located, so that the PSAP can provide emergency assistance at that particular in-building location.

The exemplary arrangement further includes a global positioning system (GPS) having a plurality of positioning satellites 32, one of which is shown by way of example. In practice, when the WCD 12 is outside of the building 30 and has a clear view of the sky, the WCD 12 can receive signals from GPS satellites. Applying well known location-determination principles, the WCD can interact with a positioning system (not shown) operated by the WCD's cellular wireless carrier, to obtain satellite-assistance data corresponding with the WCD's general location (where the general location can be determined by triangulation using cellular base station signal measurements). The satellite assistance data indicates which satellites should in theory be orbiting above the WCD's current location, such that the WCD should be able to receive signals from the satellites. In accordance with the satellite assistance data, the WCD can then tune to the various satellites and receive signals, and then by itself or through further interaction with the network-based positioning system, can determine with great accuracy the latitude and longitude coordinates of the WCD's current position. Other methods of attaining a GPS fix can be used as well.

As noted above, the WCD may be programmed to periodically obtain a GPS location fix. Once the WCD enters building 30, however, the WCD may lost its GPS coverage, i.e., its ability to receive GPS satellite signals. Thus, while within the building, the WCD may be unable to obtain another GPS location fix.

To facilitate determine of the WCD location while indoors or between GPS location fixes, the WCD is preferably programmed to engage in dead reckoning using its compass 24 and pedometer 26. More particularly, the WCD may determine its indoor location coordinates through dead reckoning from its last known GPS location coordinates. In particular, the WCD may gather measurements of its distance(s) and direction(s) of travel within the building and, applying simple geometric calculations, compute (or approximate) its current geographic location coordinates within the building, by extension from its last known location coordinates. Alternatively, the WCD may simply maintain a record of its last known location coordinates (e.g., GPS coordinates) and its distance(s) and direction(s) of travel within the building, so as to enable another entity to geometrically compute the WCD's current geographic location coordinates within the building.

As further illustrated, the exemplary arrangement includes an emergency service system 34 comprising a PSAP 36, which WCD 12 can call to report an emergency and to seek emergency assistance. (Just as well, the method could be carried out for calls of other types placed to other endpoints.) In practice, when the WCD 12 places an emergency service call, call setup signaling passes from the WCD (or an entity operating on behalf of the WCD) to the emergency service system 34. For instance, to initiate the call, the WCD may generate and send a SIP INVITE message to the emergency service system 34 and may then engage in further SIP signaling with the emergency service system to complete setup of an RTP session through which a WCD user can communicate with a PSAP operator. Further, additional SIP signaling, such as one or more SIP UPDATE messages, may pass from the WCD to the emergency service system during the course of the call. A SIP message, or other signaling message, may change form as it travels from one point to another. For instance, a SIP message may gain Via headers as it passes through various network elements.

When the WCD sends a SIP or other signaling message to the emergency service system when the WCD is within the building 30, the WCD will preferably include within the signaling message an indication of the WCD's indoor location, for use to facilitate emergency assistance. As indicated above, for instance, the indication of indoor location that is included in the signaling message could be geographic location coordinates (determined through dead reckoning for instance) or more raw data such as (i) the WCD's last known location coordinates and (ii) distance(s) and directions(s) traveled by the WCD within the building.

In the exemplary embodiment, an intermediation system 40 is then provided within the signaling communication path (and/or, in the event location data is conveyed in the bearer path, then within the bearer path) between the WCD and the emergency service system 22, to facilitate conversion of such indoor location information into a more understandable description of the portion of the building in which the WCD is located. The intermediation system 40 may take various forms (and could in fact be located within the RAN), an example of which is an IMS system including a CSCF and one or more application servers arranged to operate on signaling messages passing through the system. In operation, when the a signaling message is going to pass through the CSCF, the CSCF can analyze the message and determine that location translation is necessary (e.g., by determining that the message relates to an emergency service call, and responsively determining that location data in the message should be translated to a building portion description). The CSCF may then perform the translation or invoke another server to perform the translation, as described above for instance.

As shown, the intermediation system 40 preferably includes a network communication interface 42, a processor (e.g., one or more processors) 44, and a set of mapping data 46 that correlates indoor location coordinates with particular building portions. For instance, the mapping data 46 may comprise a table that correlates ranges of location coordinates with particular rooms, cubicles or other zones within a building and that provides for each building portion a textual description, such as room number, zone number, or the like. The building portion description is preferably sufficient to help to direct emergency service personnel, such as police officers, fire fighters, or medical service people, to the appropriate area within the building.

In operation, when a signaling message such as a SIP INVITE or SIP UPDATE passes through the intermediation system on its way from the WCD (or an entity operating on behalf of the WCD) to the emergency service system, the intermediation system may read from the signaling message the WCD's indoor location coordinates and/or the WCD's last known location coordinates and the distance(s) and direction(s) travelled by the WCD within the building. The intermediation system may then reference the mapping data 46 in order to convert that data into a description of the portion of the building in which the WCD is currently located. And the intermediation system may insert that building-portion description in the signaling message and send the signaling message along its way to the emergency service system. That way, the emergency service system will conveniently receive the building portion description and can present it to a PSAP operator to facilitate emergency assistance.

Figure 2:
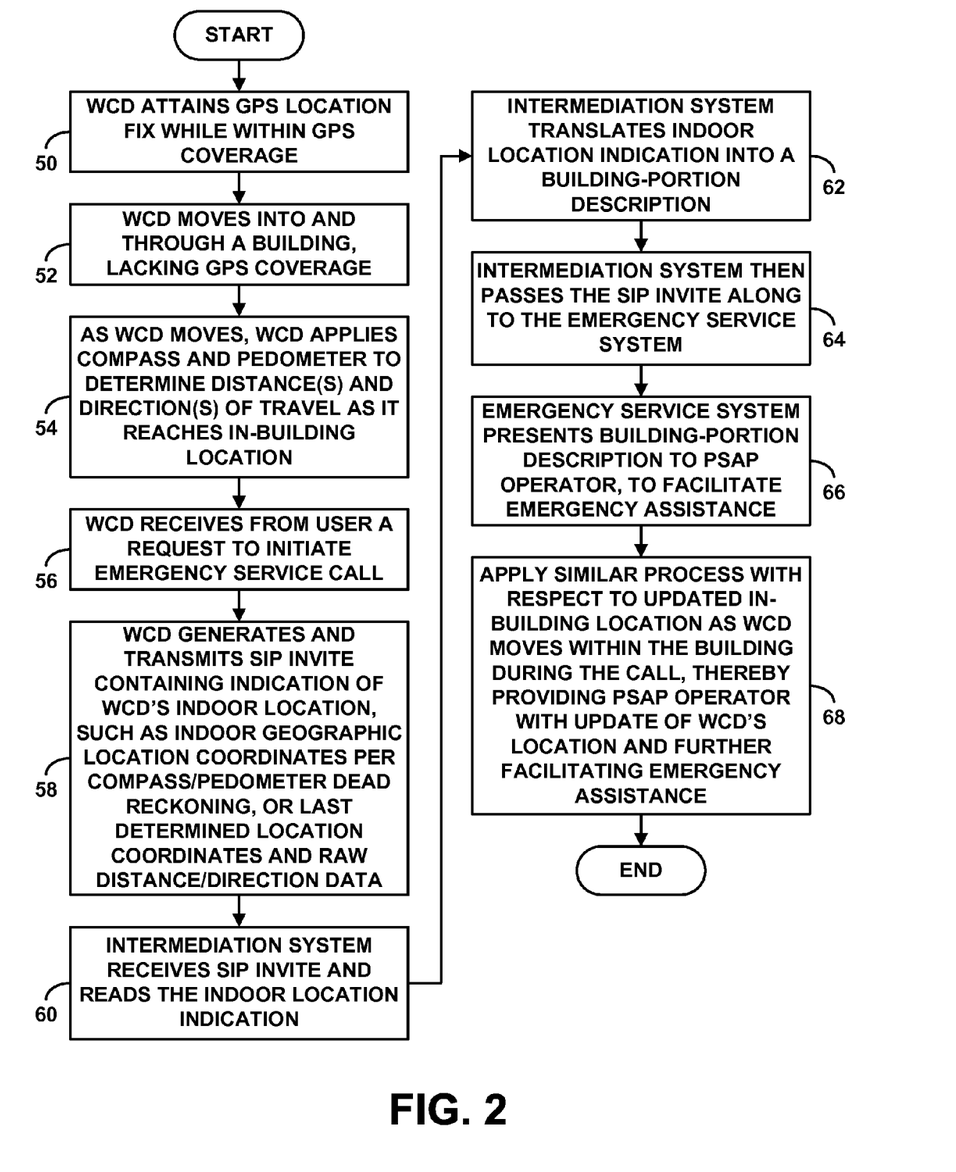
FIG. 2 is a flow chart depicting functions carried out in accordance with the method.

FIG. 2 is next a flow chart depicting functions that can carried out in accordance with the present method. As shown in FIG. 2, at step 50, the WCD 12 attains a GPS location fix while it is outside and within GPS coverage. At step 52, the WCD 12 then moves into and through the building 30, where it lacks GPS coverage. At step 54, as the WCD 12 moves, the WCD applies its compass 24 and pedometer 26 to determine its distance(s) and direction(s) of travel as it reaches a location within the building. At step 56, the WCD then receives from its user a request to initiate an emergency service call. Consequently, at step 58, the WCD generates and transmits a SIP INVITE (or other such signaling message), including within the message an indication of the WCD's indoor location. As noted above, the indication of indoor location that the WCD includes in the signaling message can be indoor geographic location coordinates that the WCD establishes by dead reckoning by using measurements from its compass and pedometer to facilitate geometric extension from its last determined location coordinates. Alternatively, the indication can be more raw data including its last determined location coordinates and its measured distance(s) and direction(s) of travel within the building.

At step 60, the intermediation system (such as an IMS system) 40 receives the SIP INVITE and reads the indoor location indication from the message. At step 62, the intermediation system then translates the indoor location indication into a building-portion description, preferably a textual description of the portion of the building encompassing the WCD's indicated indoor location. At step 64, the intermediation system then passes the SIP INVITE along to the emergency service system. And at step 66, the emergency service system presents the building-portion description to a PSAP operator, to facilitate emergency assistance.

At step 68, a similar process can then be repeated with respect to updated in-building location as the WCD moves within the building during the call, thereby providing the PSAP operator with an update of the WCD's location and further facilitating emergency assistance.

An exemplary embodiment has been described above. Those skilled in the art will understand, however, that changes and modifications may be made to this embodiment without departing from the true scope and spirit of the invention, which is defined by the claims, including their equivalents.

What is claimed is:

1. A method of conveying location of a wireless communication device (WCD) to an emergency service system comprising a Public Safety Answering Point (PSAP), the WCD including a GPS receiver and a wireless transceiver, the method comprising:

the WCD applying the GPS receiver to receive GPS satellite signals, and the WCD using the received signals to determine GPS location coordinates of the WCD;

the WCD using dead reckoning as a basis to update the GPS location coordinates in accordance with distance and direction of the WCD inside a building, thereby establishing indoor location coordinates of the WCD;

the WCD using the wireless transceiver to transmit the established indoor location coordinates in a signaling message seeking to set up a call to the emergency service system; and at an intermediary in signaling communication with the WCD and the emergency service system, (i) receiving the signaling message, (ii) translating the indoor location coordinates to a building portion descriptor that describes a portion of the building where the indoor location coordinates reside so as to produce a modified signaling message that contains the building portion descriptor, and (iii) sending the modified signaling message along to the emergency service system, wherein the signaling message invokes establishment of a session between the PSAP and the WCD, whereby the building portion descriptor facilitates emergency response.

2. The method of claim 1, wherein the WCD is a cellular telephone.

3. The method of claim 1, wherein applying the GPS receiver to receive the GPS satellite signals and using the received signals to determine GPS location coordinates of the WCD is an instance of the WCD periodically attaining of GPS location fix.

4. The method of claim 1, wherein using dead reckoning as a basis to update the GPS location coordinates in accordance with distance and direction of the WCD inside the building comprises:
using a compass to determine at least one direction of travel of the WCD;
using a pedometer to determine at least one distance of travel of the WCD; and
using the at least one direction of travel and the at least one distance of travel cooperatively to update the GPS location coordinates.

5. The method of claim 1, wherein the GPS location coordinates comprise latitude and longitude coordinates, and wherein the indoor location coordinates comprise latitude and longitude coordinates.

6. The method of claim 1, further comprising the WCD generating the signaling message, including in the signaling message a specification of the established indoor location coordinates,
wherein using the wireless transceiver to transmit the established indoor location coordinates in the signaling message seeking to set up a call to the emergency service system comprises transmitting the signaling message, including the specification, via an air interface from the WCD to a radio access network serving the WCD,
wherein the signaling message passes from the radio access network via a packet-switched network to an IP Multimedia Subsystem (IMS) Call Session Control Function (CSCF) and thereafter to the intermediary, and
wherein the intermediary transmits the modified signaling message, including the building portion descriptor provided by the intermediary, via the packet-switched network to the emergency service system, and the PSAP receives the building portion descriptor and presents the building portion descriptor to a human PSAP operator.

7. The method of claim 6, further comprising, during the session:
the WCD using dead reckoning as a basis to update the indoor location coordinates in accordance with distance and direction of the WCD inside the building, thereby establishing updated indoor location coordinates of the WCD;
the WCD using the wireless transceiver to transmit the updated indoor location coordinates in an update message; and
at the intermediary, (i) receiving the update message, (ii) translating the updated indoor location coordinates to an updated building portion descriptor so as to produce a modified update message that contains the building portion descriptor, and (iii) sending the modified update message along to the emergency service system, wherein the PSAP receives the updated building portion descriptor and presents the updated building portion descriptor to the human PSAP operator,
whereby the updated building portion descriptor further facilitates emergency response.

8. The method of claim 1, further comprising:
maintaining mapping data that correlates location coordinates with building portion descriptors,
wherein translating the indoor location coordinates to the building portion descriptor comprises referring to the mapping data to translate the indoor location coordinates to the building portion descriptor.

9. The method of claim 8, wherein the intermediary comprises a computer, and wherein maintaining the mapping data comprises maintaining the mapping data at the computer.

10. The method of claim 1, wherein the portion of the building comprises a portion selected from the group consisting of a room and an office-cubicle.

11. A method of conveying location of a wireless communication device (WCD) to an emergency service system comprising a Public Safety Answering Point (PSAP), the method comprising:
the WCD applying a GPS receiver to receive GPS satellite signals, and the WCD using the received signals to periodically attain GPS location fixes each comprising location coordinates of the WCD, including a latest GPS location fix;
the WCD then entering a building where the WCD lacks a clear enough view of the sky to attain a next GPS location fix;
once in the building, the WCD applying dead reckoning to determine at least one direction of travel of the WCD within the building and at least one distance of travel of the WCD within the building, and the WCD using the at least one determined direction and the at least one determined distance cooperatively to update the location coordinates of the latest GPS location fix so as to establish indoor location coordinates of the WCD;
while in the building, the WCD receiving from a user of the WCD an emergency service call request, and the WCD responsively transmitting, via an air interface to a radio access network for transmission in turn to the emergency service system, a signaling message seeking to set up the emergency service call, including within the signaling message the established indoor location coordinates; and
at an intermediary in a communication path between the WCD and the emergency service system, (i) receiving the signaling message, (ii) translating the indoor location coordinates to a descriptor of a portion of the building, and (iii) sending the signaling message, including the descriptor of the portion of the building, along to the PSAP,
whereby the signaling message facilitates setup of the emergency service call, and whereby the descriptor of the portion of the building facilitates emergency response.

12. The method of claim 11, wherein the WCD is a cellular telephone.

13. The method of claim 11, wherein the GPS location coordinates comprise latitude and longitude coordinates, and wherein the indoor location coordinates comprise latitude and longitude coordinates.

14. The method of claim 11, wherein the signaling message passes from the radio access network via a packet-switched network to an IP Multimedia Subsystem (IMS) Call Session Control Function (CSCF) and thereafter to the intermediary.

15. The method of claim 11, further comprising, during the emergency service call:
the WCD applying dead reckoning as a basis to update the indoor location coordinates in accordance with distance and direction of the WCD inside the building, thereby establishing updated indoor location coordinates of the WCD;

the WCD transmitting the updated indoor location coordinates in an update message; and at the intermediary, (i) receiving the update message, (ii) translating the updated indoor location coordinates to an updated building portion descriptor, and (iii) sending the update message, including the updated building portion descriptor, along to the PSAP, wherein the PSAP receives the updated building portion descriptor and presents the updated building portion descriptor to the human PSAP operator, whereby the updated building portion descriptor further facilitates emergency response.

16. The method of claim 11, wherein the portion of the building comprises a portion selected from the group consisting of a room and an office-cubicle.

* * * * *